(12) United States Patent
Bryan et al.

(10) Patent No.: US 10,902,753 B2
(45) Date of Patent: Jan. 26, 2021

(54) ELECTRONIC SHELF LABEL SYSTEM

(71) Applicant: Wal-Mart Stores, Inc., Bentonville, AR (US)

(72) Inventors: Greg Bryan, Bentonville, AR (US); Robert Taylor, Rogers, AR (US); Todd Mattingly, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 198 days.

(21) Appl. No.: 15/836,422

(22) Filed: Dec. 8, 2017

(65) Prior Publication Data

US 2018/0190160 A1 Jul. 5, 2018

Related U.S. Application Data

(60) Provisional application No. 62/440,640, filed on Dec. 30, 2016.

(51) Int. Cl.
| | |
|---|---|
| *G09F 3/20* | (2006.01) |
| *G06Q 10/08* | (2012.01) |
| *G06Q 20/38* | (2012.01) |
| *A47F 5/00* | (2006.01) |
| *G06K 19/07* | (2006.01) |
| *G06Q 30/06* | (2012.01) |

(52) U.S. Cl.
CPC ............ *G09F 3/208* (2013.01); *A47F 5/0068* (2013.01); *G06K 19/0726* (2013.01); *G06Q 10/087* (2013.01); *G06Q 20/387* (2013.01); *G06Q 30/06* (2013.01)

(58) Field of Classification Search
None
See application file for complete search history.

(56) References Cited

U.S. PATENT DOCUMENTS

| | | | | | |
|---|---|---|---|---|---|
| 4,420,773 | A | * | 12/1983 | Toyoda | G11B 27/024 348/231.1 |
| 5,495,576 | A | * | 2/1996 | Ritchey | G06T 17/00 345/420 |

(Continued)

FOREIGN PATENT DOCUMENTS

| | | |
|---|---|---|
| CA | 2798624 C | 1/2014 |
| EP | 0557361 B1 | 10/1996 |
| EP | 2309378 A2 | 4/2011 |

OTHER PUBLICATIONS

"Pop Rotating Sign Clip Merchandise Clamp Clear With Price Label Holder 10PCS", eBay.com, accessed Oct. 20, 2016 (5 pp).

(Continued)

*Primary Examiner* — Fateh M Obaid
(74) *Attorney, Agent, or Firm* — Jeffri A. Kaminski; Venable LLP

(57) ABSTRACT

Systems, methods, and computer-readable storage devices for an electronic label for use within shelf label tracks in stores. Such electronic labels receive initial information associated with an item being sold and begin displaying that information. When a change occurs such that the label needs to be modified, a record of the original information is retained within memory in the electronic label, such that the modified display can be used until the need for the modification ends. At that point, the electronic label can be restored to display the original information again using the stored record.

14 Claims, 5 Drawing Sheets

(56) References Cited

U.S. PATENT DOCUMENTS

| | | | |
|---|---|---|---|
| 5,537,312 A | 7/1996 | Sekiguchi et al. | |
| 6,035,569 A | 3/2000 | Nagel et al. | |
| 7,152,040 B1* | 12/2006 | Hawthorne | G06Q 10/087 |
| | | | 705/16 |
| 9,268,977 B2 | 2/2016 | Karhuketo et al. | |
| 2006/0163349 A1 | 7/2006 | Neugebauer | |
| 2006/0180647 A1* | 8/2006 | Hansen | B60S 3/00 |
| | | | 235/375 |
| 2012/0055985 A1* | 3/2012 | Allen | G06Q 10/08 |
| | | | 235/375 |
| 2016/0134930 A1 | 5/2016 | Swafford | |

OTHER PUBLICATIONS

International Search Report and Written Opinion issued in corresponding International Application No. PCT/US2017/065336 dated Feb. 28, 2018 (9 pp).

* cited by examiner

ELECTRONIC SHELF LABEL SYSTEM

BACKGROUND

1. Technical Field

The present disclosure relates to electronic shelf labelling, and more specifically to an electronic shelf label which can be modified to display new information while retaining in memory original information.

2. Introduction

Modern store shelving often makes use of a track labeling system, where price tags and other labels associated with inventory items can be easily moved, modified, and/or adjusted. For example, immediately below each shelf in a supermarket or other store a label can be attached to a track. The label may indicate the price of an item, the maximum number of items which can be displayed on the shelf, special offers/discounts, nutritional information, etc. These labels can be moved left or right, or removed altogether, as needed by store associates as the item stock changes or is moved. Such traditional labels are generally printed on paper or other fixed mediums. However, as shelf labelling systems continue to improve, printed paper labels are often being replaced within the tracks by electronic shelf labels.

SUMMARY

A label having a housing configured to engage with a shelf label track, an electronic display attached to the housing, a processor contained within the housing, and a computer-readable storage device within the housing, the computer-readable storage device having instructions stored which, when executed by the processor, cause the processor to perform operations comprising: receiving data associated with an item; recording the data within the computer-readable storage device, to yield recorded data; setting the electronic display to display the recorded data; receiving a notification indicating that the recorded data is not current; modifying the electronic display based on the notification, such that the recorded data is not displayed; after modifying the electronic display, receiving a subsequent notification indicating that the recorded data should be displayed; and setting the electronic display, based on the subsequent notification, to display the recorded data again.

A method comprising receiving data associated with an item, wherein at least a portion of the data is to be displayed on an electronic display, the electronic display being part of a label configured to engage with a shelf label track, recording the data within a computer-readable storage device, to yield recorded data, setting, via a processor in the label, the electronic display to display the recorded data, receiving a notification indicating that the recorded data is not current, modifying the electronic display based on the notification, such that the recorded data is not displayed, after modifying the electronic display, receiving a subsequent notification indicating that the recorded data should be displayed, and setting the electronic display, based on the subsequent notification, to display the recorded data again.

A computer-readable storage device having instructions stored which, when executed by a computing device, cause the computing device to perform operations comprising: receiving data associated with an item, wherein the data is to be displayed on an electronic display, the electronic display being part of a label configured to engage with a shelf label track, recording the data within a computer-readable storage device, to yield recorded data, setting, via a processor in the label, the electronic display to display the recorded data, receiving a notification indicating that the recorded data is not current, modifying the electronic display based on the notification, such that the recorded data is not displayed, after modifying the electronic display, receiving a subsequent notification indicating that the recorded data should be displayed, and setting the electronic display, based on the subsequent notification, to display the recorded data again.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
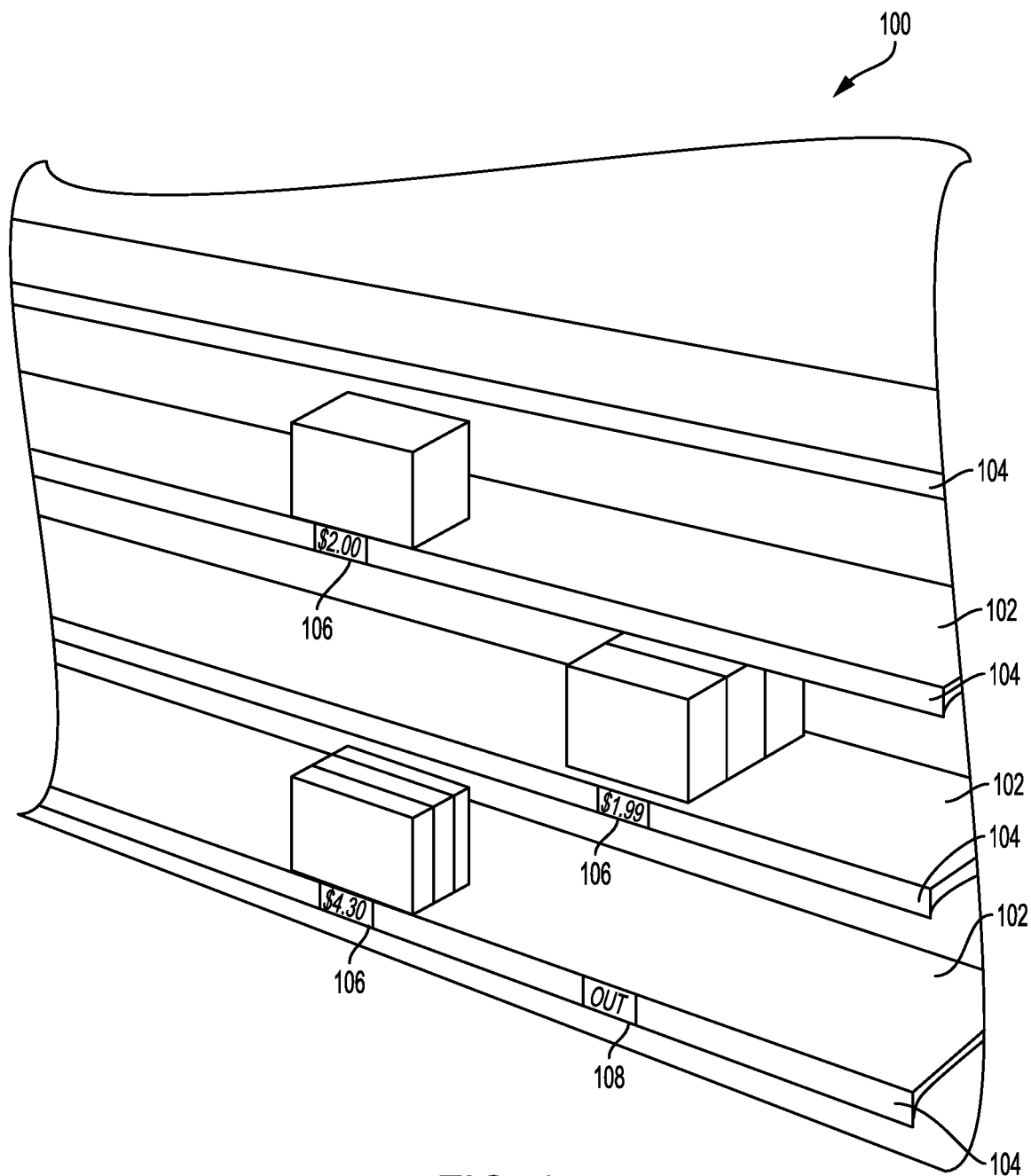
FIG. 1 illustrates an example of a shelf system using electronic labelling.

A system, method and computer-readable media are disclosed for an electronic shelf label, where the electronic label has built in memory which can be used to retain information different than the information currently being displayed. This memory allows the electronic label to shift, change, or revert, between display configurations. For example, the electronic label can be programmed by a store associate or others to display the price of a loaf of bread at $1.99. When the shelf is temporarily out of bread loaves, the electronic label can be modified to display "Out of Stock" (or a variant thereof). However, because electronic labels configured according to this disclosure can retain the original label information, when the loaves are restocked the original pricing information does not need to be re-entered. Instead, the electronic label can be reverted to the original configuration, thereby (1) reducing the opportunities to introduce error into the labels by reducing the number of label assignments made, and (2) improving the time required to change labels back to previous values.

It is noted that shelf labels as discussed herein can be identified by multiple, distinct terms, such as labels, electronic labels, modulars, modular label displays, etc. For purposes of this disclosure, all such items configured according to this disclosure are electronic labels, regardless of specific mechanisms of attachment, specific configuration, or variations.

In one configuration, the setting of the electronic label is performed by an associate working in the store. The associate can approach a portion of a shelf associated with a specific item, insert the electronic label into the track just below that portion of the shelf and, using a hand-held electronic device, configure the newly inserted electronic label to display information associated with the specific item. When a revision to the information displayed by the label is required, such as when the item is out of stock or when a sale is on-going, the associate can then approach the electronic label and provide updated information. The label can then display and store the updated information. The original information is saved within memory found on the electronic label, such that while the label is displaying the updated information, the electronic label retains the original information in memory. When the revision is no longer required, such as when a restocking takes place or the sale ends, the associate can return to the label and cause a reversion to the previous (original) information, or other information stored in the label memory.

In an alternative configuration, the process of setting the electronic label, updating the label with new or revised information, and reverting the label to the original status can be performed wirelessly from a central server. For example, a central server can transmit instructions to set the initial display information, update the display information, and to cause a reversion in the information being displayed. Transmission of these instructions can occur over WiFi, RF, or other wireless mechanisms.

The electronic label can be held in place within the label track by tabs on the top and bottom portions of the track. Other mechanisms for holding the electronic label in place can include magnets and adhesive. In some configurations, insertion of the electronic label into the label track can only occur at specific end points where the track is open, whereas in other configurations the electronic label can be pressed, wedged, or otherwise coupled to the label track at any location.

The electronic label may be able to identify its location within the label track. This may be accomplished using one or more of resistors built into the label track, GPS, RF signaling/triangulation systems, or magnets. This location can be transmitted to a server, where the location being transmitted can be compared to a planned location for the label and/or other displays within the store. If the location of the electronic label improperly changes, a notification can be sent to store personnel to check the label and ensure it is in the correct location and displaying the intended information.

Various embodiments of the disclosure are described in detail below. While specific implementations are described, it should be understood that this is done for illustration purposes only. Other components and configurations may be used without parting from the spirit and scope of the disclosure.

FIG. 1 illustrates an example of a shelf system 100 using electronic labelling. In this example 100, each shelf 102 has an accompanying label track 104. Where the shelves 102 have items, an accompanying electronic label 106, 108, is located beneath the items. In this example, most of the electronic labels 106 show prices for the various items. In other configurations or conditions, these electronic labels 106 could display additional or different information, such as the item name, savings due to a sale, a comparison of the suggested sales price to the actual sales price, quantity remaining on the shelf, quantity remaining in the store, etc. When items are out of stock or otherwise unavailable, the electronic label 108 can be configured to display "Out," "Out of Stock," "OoS" (short for Out of Stock), or other messages to convey that the item is currently not found on the shelf 102. The electronic labels 106, 108 can be inserted into the label tracks 104 by store associates as the items are stocked, or as a plan for item allocation is implemented. The setting, modifying, and reverting of the electronic labels can likewise be performed by store associates. In other configurations, the setting, modifying, and reverting of the electronic labels can be performed by a server or wirelessly.

Figure 2:
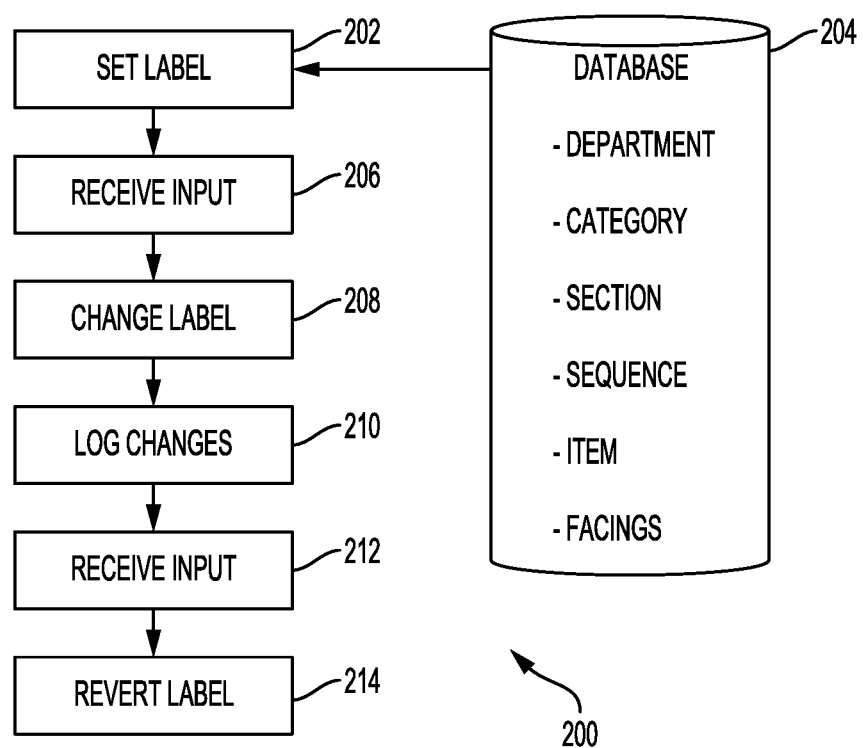
FIG. 2 illustrates exemplary steps for setting and reverting a label.

FIG. 2 illustrates exemplary steps 200 for setting and reverting an electronic label 106, 108. First, the label is set (202), meaning the information for the product being associated with the label is loaded into the label memory. As illustrated, this information can come from a database 204, where the database contains data such as the product department of the product associated with the label, the category of that product, and the section where the product should be located. The database can also include information regarding the "sequence," meaning where on the shelf the product should be located with respect to other items, the name of the item/product, and the number of facings (which can refer to either the number of individual units which should be facing out from the store shelf, or the amount of shelf space allocated to the particular product). Additional information which the database may contain can be data regarding inventory within the store, restock dates, and a timer for how long until an associate needs to perform a periodic check on the item. Once the label is set (202), some or all of this information may be stored in the label's memory. For example, some or all of the information from the database can be recorded in memory on the label, and the label can display information such as the product name and price of the product (as well as any other desired information) via the label.

When circumstances arise that require the label to be changed (208), such as a temporary change in price (for example, a weekend sale) or an item being out of stock, additional information can be received by the label. This additional information can come from the database 204 and be conveyed via a store associate or via a server. The additional information is logged in the label memory (210) such that the label can display the updated information. However, the original information is not removed from the label memory. Instead, the original information is retained in the label memory such that when the price reverts to the original value, or the item is restocked, the label can quickly revert to the original information. This original information can be stored within the label memory as base data, or original data, e.g., a "regular price," and can be identified as a "default" or base display information. This default information can include the product name, the default price, the product size, etc. When a sale occurs, or when the product is out of stock, the label memory can be updated to contain information about the sale such as the sales price, the dates of the sale, bundle information (i.e., 2-for-1, buy 3 get one half off), etc. This information can be uploaded or stored in a memory location specifically identified as sale specific. The processor can receive instructions and can display the sale price. Then, upon receiving a subsequent instruction, can retrieve the original price from the memory location and then display that original price. The subsequent notification to display the original price can be a simple instruction to return to the standard display information—the subsequent notification does not need to contain or otherwise resubmit that information to the label.

For example, when reversion to the original information needs to occur, the label will receive input (212) indicating that such a reversion is occurring. Such input can come from a store associate using a handheld input device or from a store server. The input can be a command to restore the price (or other data) to the original information, at which point the label can revert (214) to the original information.

Consider the following additional example. The label memory can store primary product information, such as the item description, the price, etc. The label could have a secondary memory location for a secondary product, having distinct price and description information. Upon receiving a notification, the label can shift from displaying the information associated with the primary product to information associated with the secondary product. Upon receiving a subsequent notification, the label can shift back to displaying the primary product.

Figure 3:
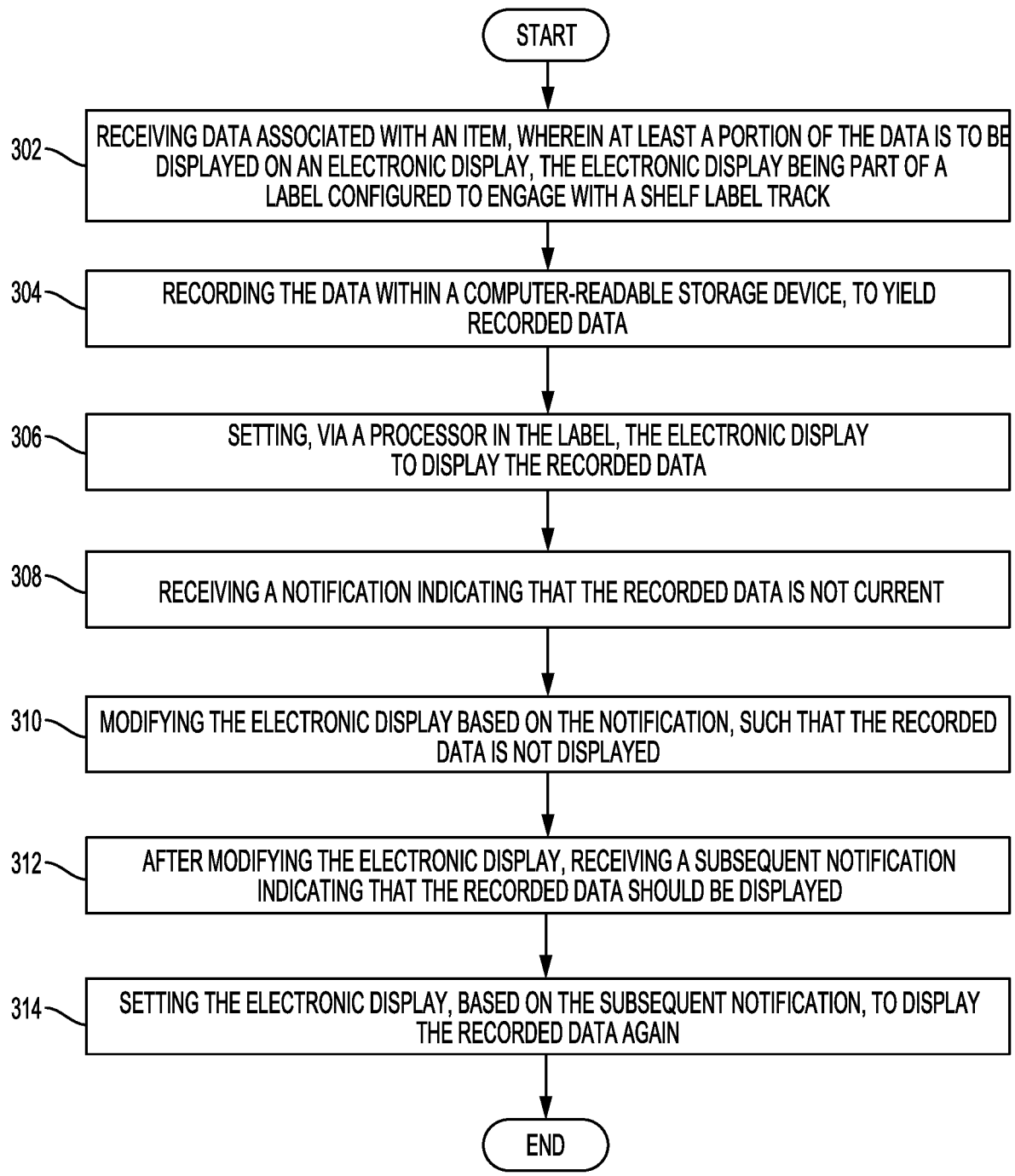
FIG. 3 illustrates an example method embodiment.

FIG. 3 illustrates an example method embodiment, being performed from the perspective of the electronic label 106 in FIG. 1. Components of the label 106 can include a housing configured to engage with the shelf label track 104, an electronic display attached to the housing, a processor, and a computer-readable storage device which can contain instructions for the processor, as well as information about products associated with the label. In some configurations, the housing can contain a battery, a transmitter, a receiver, a combination transmitter and receiver (a "transceiver"), multiple memory devices, and/or I/O (Input/Output) ports.

In this example, the label 106 receives data associated with an item, wherein at least a portion of the data is to be displayed on an electronic display. The electronic display is part of a label 106 that is configured to engage with a shelf label track (302). The label records the data within a computer-readable storage device, to yield recorded data (304) and sets, via a processor within the label 106, the electronic display to display the recorded data (306). After setting the label 106 and displaying the recorded data, the label 106 receives a notification indicating that the recorded data is not current (308). This notification may be received from a remote server or from a hand held mobile device being operated by a store associate. In an alternative configuration, the label can have a touch display having additional product description information available. Using this touch display, store associates can use the touch interface to access the label memory, and either change or access information which may otherwise not be available to the store customers. For example, the associate may be able to access the label memory and determine how many facings are available for a specific product.

The electronic display is modified based on the notification that the recorded data is not current, such that the recorded data is not displayed (310). After modifying the information shown on the electronic display such that the recorded data is not displayed, the label 106 receives a subsequent notification and/or different data indicating that the recorded data should be displayed again (312), at which point the label 106 sets the electronic display, based on the subsequent notification, to display the recorded data again (314).

In some configurations, the method can further include identifying a location of the label 106 within the shelf label track 104. The identification of the location can be based on resistors built into the shelf label track 104, GPS signals received by the label 106, radio frequency (RF) signaling, etc. The location identified can be communicated to a server. The server may contain a plan for items, displays, and other labels within a store.

The initial setting of the label 106, the receiving of the notifications, can all be initiated by a hand-held device operated by a human worker (such as a store associate). In other configurations, such processes can be performed by a store server performing inventory management and/or other store management functions.

Figure 4:
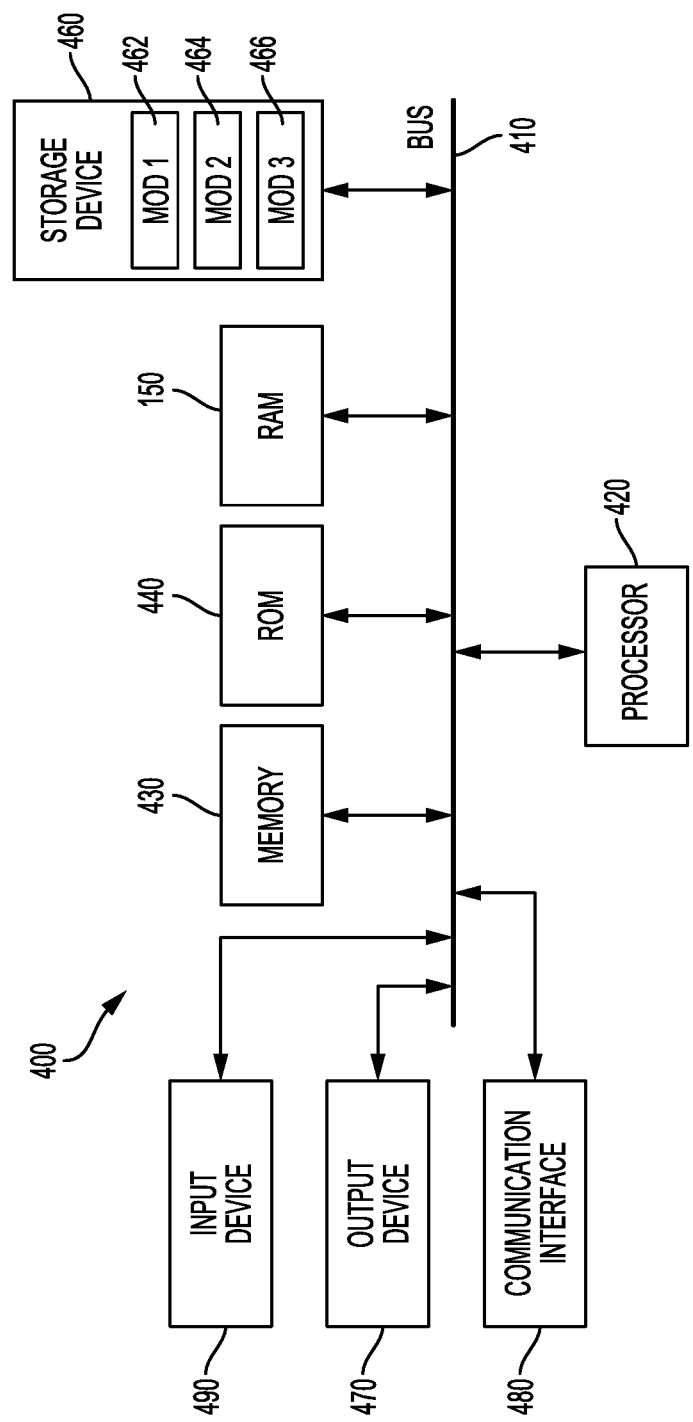
FIG. 4 illustrates an exemplary computer system.

The processor and computer-readable storage device associated with the method of FIG. 3 are described in further detail in FIG. 4, which illustrates an exemplary system 400 includes a general-purpose computing device 400, including a processing unit (CPU or processor) 420 and a system bus 410 that couples various system components including the system memory 430 such as read only memory (ROM) 440 and random access memory (RAM) 450 to the processor 420. The system 400 can include a cache 422 of high speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as Mod1 462, Mod2 464, and Mod3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

In certain embodiments, the label may contain at least one machine-readable code, wherein the machine-readable code may be a two-dimensional barcode (e.g., a linear barcode, a Quick Response (QR) Code, a DataMatrix code). In selected embodiments, a machine-readable code may encode a product identification number uniquely identifying the product, cost of the product, price of the product, weight of the product and so on.

Figure 5:
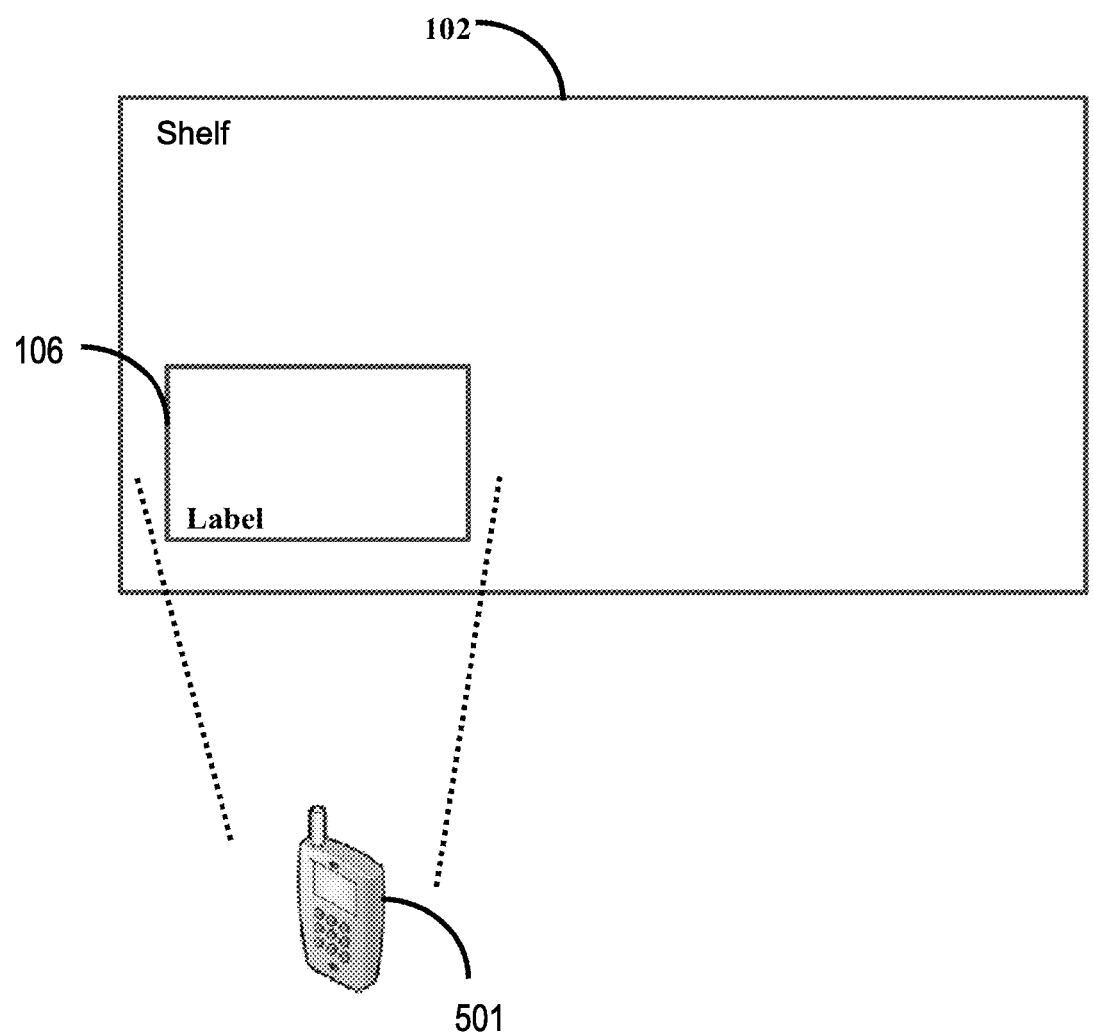
FIG. 5. illustrates an exemplary handheld device for scanning a label.

In an embodiment, FIG. 5 depicts a handheld device 501 scanning a label 106 present on a shelf 102. The label 106 may include an alphanumeric data based label, a machine-readable data based label, or a RFID based label or other electronic label as described above. The handheld device 101 may be any suitable device capable of reading the label 106. Examples of the handheld device 101 may be a mobile phone, a PDA, a tablet, a handheld scanner or a dedicated scanning device. The handheld device 101 may comprise of more than one type of scanner, wherein the scanner used for reading a particular label depends on the type of label being scanned. The handheld device 101 comprises an application, wherein the application performs the functions as detailed herein. The handheld device 101 may be brought by the consumer into the retail location. In certain embodiments, the handheld device 101 may be provided to the consumer by the retailer for use at the retail location.

In an example, the handheld device 501 comprises of a scanner (such as a camera, laser scanner and so on) which the consumer uses to scan the label containing a machine-readable code (such as a barcode, QR code and so on). The QR code can be read to provide information about the product on the shelf. In addition, the code may be used to direct the customer to a retailer's website to order the product. In addition, the code may be used to interact with the retail store location to determine if there is any of the product available or to request that the product be re-stocked on the shelf. The code may also identify a location within the store, such as a particular aisle, shelf, etc. where the code that is scanned is located. Using the store planogram, it may be determined what item is at that location, and actions taken based on that information.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. An electronic label, comprising:
   a housing configured to engage with a shelf label track at any location on the shelf label track;
   an electronic, touch display attached to the housing;
   a processor contained within the housing; and
   a computer-readable storage device within the housing, the computer-readable storage device having instructions stored which, when executed by the processor, cause the processor to perform operations comprising:
      identifying a location of the electronic label within the shelf label track based on resistors built into the shelf label track;
      receiving data associated with an item;
      recording the data within the computer-readable storage device, to yield recorded data;
      setting the electronic, touch display to display the recorded data based on the location;
      receiving a notification indicating that the recorded data is not current;
      modifying the electronic, touch display based on the notification, such that the recorded data is not displayed;
      after modifying the electronic, touch display, receiving a subsequent notification indicating that the recorded data should be displayed; and
      setting the electronic, touch display, based on the subsequent notification, to display the recorded data again.

2. The electronic label of claim 1, further comprising a battery contained within the housing.

3. The electronic label of claim 1, wherein the computer-readable storage device has additional instructions stored which, when executed by the processor, cause the processor to perform operations comprising:
   communicating the location of the electronic label to a server, wherein the server contains a plan for items and displays within a store.

4. The electronic label of claim 1, wherein the receiving of the data, the receiving of the notification, and the receiving of the subsequent notification, are initiated by a handheld device operated by a human worker.

5. The electronic label of claim 1, wherein the receiving of the data, the receiving of the notification, and the receiving of the subsequent notification, are initiated by a store server performing inventory management.

6. A method comprising:
   identifying a location of an electronic label within a shelf label track based on resistors built into the shelf label track, the electronic label configured to couple to the shelf label track at any location on the shelf label track;
   receiving data associated with an item, wherein at least a portion of the data is to be displayed on an electronic touch display, the electronic touch display being part of the electronic label configured to engage with the shelf label track;
   recording the data within a computer-readable storage device, to yield recorded data; setting, via a processor in the electronic label, the electronic touch display to display the recorded data based on the location;
   receiving a notification indicating that the recorded data is not current;
   modifying the electronic display based on the notification, such that the recorded data is not displayed;

after modifying the electronic touch display, receiving a subsequent notification indicating that the recorded data should be displayed; and setting the electronic touch display, based on the subsequent notification, to display the recorded data again.

7. The method of claim 6, wherein the label further comprises a battery.

8. The method of claim 6, further comprising:

communicating the location of the electronic label to a server, wherein the server contains a plan for items and labels within a store.

9. The method of claim 6, wherein the receiving of the data, the receiving of the notification, and the receiving of the subsequent notification, are initiated by a hand-held device operated by a human worker.

10. The method of claim 6, wherein the receiving of the data, the receiving of the notification, and the receiving of the subsequent notification, are initiated by a store server performing inventory management.

11. A non-transitory computer-readable storage device having instructions stored which, when executed by a computing device, cause the computing device to perform operations comprising:

receiving data associated with an item, wherein the data is to be displayed on an electronic display, the electronic display being part of a label configured to engage with a shelf label track at any location on the shelf label track;

recording the data within a computer-readable storage device, to yield recorded data;

identifying a location of the electronic label within the shelf label track based on resistors built into the shelf label track;

setting, via a processor in the label, the electronic display to display the recorded data based on the location;

receiving a notification indicating that the recorded data is not current;

modifying the electronic display based on the notification, such that the recorded data is not displayed;

after modifying the electronic display, receiving a subsequent notification indicating that the recorded data should be displayed; and setting the electronic display, based on the subsequent notification, to display the recorded data again.

12. The non-transitory computer-readable storage device of claim 11, wherein the label further comprises a battery.

13. The non-transitory computer-readable storage device of claim 11, having additional instructions stored which, when executed by the computing device, cause the computing device to perform operations comprising:

communicating the location of the label to a server, wherein the server contains a plan for items and displays within a store.

14. The non-transitory computer-readable storage device of claim 11, wherein the receiving of the data, the receiving of the notification, and the receiving of the subsequent notification, are initiated by a hand-held device operated by a human worker.

* * * * *